(12) United States Patent
Barr et al.

(10) Patent No.: US 8,016,211 B2
(45) Date of Patent: Sep. 13, 2011

(54) PINTLE-CONTROLLED PROPULSION SYSTEM WITH EXTERNAL RING ACTUATOR

(75) Inventors: Dustin C. Barr, Fair Oaks, CA (US); Michael D. Lynch, Granite Bay, CA (US)

(73) Assignee: Aerojet-General Corporation, Sacramento, CA (US)

( * ) Notice: Subject to any disclaimer, the term of this patent is extended or adjusted under 35 U.S.C. 154(b) by 927 days.

(21) Appl. No.: 12/041,810

(22) Filed: Mar. 4, 2008

(65) Prior Publication Data

US 2009/0230212 A1 Sep. 17, 2009

Related U.S. Application Data

(60) Provisional application No. 60/909,029, filed on Mar. 30, 2007.

(51) Int. Cl.
*B63H 11/10* (2006.01)
(52) U.S. Cl. .................. 239/265.19; 60/771
(58) Field of Classification Search ............. 239/265.19; 60/770, 771, 257, 258
See application file for complete search history.

(56) References Cited

U.S. PATENT DOCUMENTS

| | | | | |
|---|---|---|---|---|
| 2,613,497 A * | 10/1952 | Gilmour | .................. | 60/229 |
| 2,637,973 A * | 5/1953 | Lovell, Jr. | ................ | 60/259 |
| 3,059,425 A * | 10/1962 | McSherry et al. | ........ | 60/242 |
| 3,073,112 A * | 1/1963 | Bleikamp, Jr. | ............. | 60/242 |
| 3,150,485 A * | 9/1964 | Hickerson | ................ | 60/258 |
| 3,192,714 A * | 7/1965 | Hickerson | ................ | 60/230 |
| 3,230,704 A * | 1/1966 | Lovingham | .............. | 60/225 |
| 3,234,731 A * | 2/1966 | Buergin et al. | ............ | 60/258 |
| 3,302,890 A * | 2/1967 | Silver | ................. | 239/265.31 |
| 3,319,423 A * | 5/1967 | Caraher | ................... | 60/242 |
| 3,427,809 A * | 2/1969 | Lavoie | .................... | 60/231 |
| 3,608,312 A * | 9/1971 | Miltenberger | ............ | 60/204 |
| 3,662,547 A * | 5/1972 | Paine et al. | .............. | 60/258 |
| 3,726,480 A * | 4/1973 | Miltenberger | ....... | 239/265.19 |
| 3,848,806 A * | 11/1974 | Samuelsen et al. | .... | 239/265.11 |
| 3,871,173 A | 3/1975 | McKenna | | |
| 3,940,067 A * | 2/1976 | Cherry et al. | ........ | 239/265.11 |
| 3,948,042 A * | 4/1976 | Beardsley et al. | ......... | 60/242 |
| 4,478,040 A * | 10/1984 | Johnson | .................. | 60/225 |
| 5,394,690 A * | 3/1995 | Arszman et al. | .......... | 60/233 |
| 5,491,973 A | 2/1996 | Knapp et al. | | |
| 6,170,257 B1 | 1/2001 | Harada et al. | | |
| 6,233,919 B1 * | 5/2001 | Abel et al. | ................ | 60/204 |
| 6,502,384 B1 | 1/2003 | Onojima et al. | | |
| 6,591,603 B2 * | 7/2003 | Dressler et al. | ........... | 60/258 |
| 6,629,416 B1 * | 10/2003 | Johnson | .................. | 60/770 |
| 6,964,154 B1 * | 11/2005 | Sackheim et al. | ......... | 60/224 |
| 6,986,246 B2 * | 1/2006 | Fujita | ..................... | 60/242 |
| 7,155,898 B2 * | 1/2007 | Sota et al. | ................ | 60/230 |
| 7,509,796 B2 * | 3/2009 | Hansen | ................... | 60/225 |
| 7,565,797 B2 * | 7/2009 | Nyberg et al. | ............. | 60/253 |
| 7,849,695 B1 * | 12/2010 | Cover et al. | ............... | 60/771 |
| 2007/0163227 A1 * | 7/2007 | Mano et al. | ............... | 60/200.1 |

* cited by examiner

*Primary Examiner* — William H Rodriguez
(74) *Attorney, Agent, or Firm* — Kilpatrick Townsend & Stockton LLP.; M. Henry Heines

(57) ABSTRACT

A propulsion system with a divergent-convergent nozzle is provided with variable thrust by a pintle whose position relative to the nozzle throat is controlled by an actuator that includes a rotor that external to, and encircling, the nozzle, and that is coupled to either the pintle or to the nozzle shell by a linkage that translates the rotary movement of the rotor into linear movement of either the pintle or the shell.

6 Claims, 3 Drawing Sheets

PINTLE-CONTROLLED PROPULSION SYSTEM WITH EXTERNAL RING ACTUATOR

CROSS-REFERENCE TO RELATED APPLICATION

This application claims the benefit of U.S. Provisional Patent Application No. 60/909,029, filed Mar. 30, 2007, the contents of which are incorporated herein by reference in their entirety.

BACKGROUND OF THE INVENTION

1. Field of the Invention

This invention resides in the field of propulsion systems, and in particular in the design of nozzles that can be manipulated or transformed during use to adapt to changes encountered in either the propulsion system or the environment.

2. Description of the Prior Art

The thrust produced by a rocket motor tends to change with changes in altitude, environmental conditions, propellant mass flow, and propellant burning rate, and can vary as burning progresses. These changes affect the performance of the motor and of the vehicle driven by the motor, as well as the effectiveness of the vehicle in performing its mission. In some cases, a change in thrust is detrimental to rocket performance, while in others, a change in thrust is desired but may not be achieved quickly enough to the degree that is needed or at the point in time where the change is needed. To illustrate, as propellant supply is gradually depleted, the rate at which combustion gases are generated often decreases, causing a drop in chamber pressure. If this drop occurs during the boost phase of a rocket or at any time when a prolonged period of high-level thrust is needed, the efficiency of the rocket performance will suffer. On the other hand, a decrease in thrust is beneficial in rocket-powered launch vehicles that require high thrust at takeoff due to the large amount of unburnt propellant initially present in the vehicle, and lower thrust during flight. This is particularly true for vehicles that are launched from the earth's surface but whose primary mission is performed at high altitude where the atmosphere is often at high vacuum. The primary mission often requires a high specific impulse ($I_{sp}$), i.e., a high ratio of thrust to the weight of propellant consumed in a unit of time, which is most readily achieved with a high area ratio, i.e., a high ratio of the area at the nozzle exit to the area at the throat. Nozzles with high area ratios tend to produce relatively low thrust at sea level, however, because of a reverse pressure differential near the nozzle exit that occurs when the wall pressure is below ambient pressure. In supersonic nozzles, one of the most important factors in controlling and maintaining thrust is the nozzle throat, since the pressure drop across the throat directly affects thrust as well as factors contributing to the thrust, such as the chamber pressure.

Numerous constructions have been developed in the history of rocket design for nozzles whose thrust can be varied during flight. Attempts to correct for reverse pressure differentials, for example, have been made by designing nozzles whose nozzle exit area is reduced for launch and then gradually increased during ascent. Nozzles have thus been designed with mechanically adjustable contours, area ratios and lengths. Other methods have included the use of combination-type engines using different propellants at different stages of flight. Kerosene-fueled engines have thus been combined with engines derived from the Space Shuttle Main Engine (SSME) or with hydrogen-fueled engines such as the Russian RD-701 engine. Other examples of combination-type engines are the dual-fuel-dual-expander engine of Beichel, R., U.S. Pat. No. 4,220,001 (issued Sep. 2, 1980), and the dual-thrust rocket motor of Bornstein, L., U.S. Pat. Nos. 4,137,286 (issued Jan. 30, 1979) and 4,223,606 (issued Sep. 23, 1980). The Beichel engine requires a complex nozzle design that incorporates two thrust chambers, while the Bornstein motor achieves dual thrust by using separate sustainer and booster propellant grains in the combustion chamber, together with an igniter and squib that are inserted into the grain itself. Thrust variation has also been achieved by the introduction of secondary combustion gas near the wall of the divergent section of a nozzle, as described by Bulman, M., in U.S. Pat. No. 6,568,171 (issued May 27, 2003).

A still further means of achieving thrust variation is the use of a pintle for varying the effective area of the throat. A pintle is either a tapered or flared body that resides inside the nozzle and is movable along the nozzle axis, partially obstructing the throat and forcing the combustion gas to flow in the annular space between the pintle and the throat wall. With its tapered or flared profile, movement of the pintle by a small distance causes a significant change in the cross section area of the annular space and hence the effective throat area. In a solid propellant system, as burning progresses and the propellant supply rate is reduced, the pintle can be moved in a direction that will reduce the effective throat area in order to maintain combustion efficiency by increasing the pressure in the combustion chamber, although at a lower thrust. A pintle therefore provides versatility to the rocket motor by allowing wide variation in the effective throat area and by being movable at will or programmable to move in either direction at any stage of the rocket propulsion. Pintle actuation can be achieved by a hydraulic drive, a gear drive, or any known mechanism for controlled movement. In many rocket designs, the pintle actuation system is located within the section of the rocket motor through which propulsion gas flows, the actuation system thereby consuming volume that would otherwise be used for gas generation or thrust development. Other limitations of internal pintle actuation systems are that such systems are subject to the high temperatures and other harsh conditions that are present inside the motor and therefore vulnerable to breakdown, and that they are difficult to gain access to when they require maintenance, repair or replacement. The harsh conditions also require that the actuation systems be insulated, thereby adding further weight to the system.

SUMMARY OF THE INVENTION

The present invention resides in a pintle-controlled propulsion system whose annular throat is controlled by a rotor that is external to the system and encircles the gas sections through which gas flows. Changes in the annular throat area are achieved by rotation of the rotor which is coupled to components of the propulsion system in such a manner that the rotary motion is translated into linear motion of either the pintle or the motor shell that encompasses the nozzle at the throat and surrounds the pintle, thereby changing the position of the pintle relative to the nozzle and varying the annular throat area. Actuation of the pintle may thus involve either a movable pintle and a fixed motor shell or a fixed pintle and a movable motor shell.

The rotor can be driven by conventional means, such as for example by a direct drive torque DC motor. Such motors are well known in the art and readily available from suppliers in the electronics industry. The coupling between the rotor and the portion of the propulsion system that the rotor moves is achieved by conventional linkages for translating rotary motion to linear motion. Threaded couplings, notably ball screws or Acme screws, are examples of such linkages. Another example is a toothed ring arranged to mesh with a gear attached to the housing.

In all of these designs, the combustion gas that drives the propulsion system passes through the center of the rotor, and the rotor is preferably insulated from the gas and the high-temperature components of the system. These and other embodiments, aspects, objects, and advantages of the invention will be more readily understood from the description that follows.

BRIEF DESCRIPTION OF THE DRAWINGS

FIG. 1 depicts the motor and the pintle at one position relative to each other, while FIG. 2 depicts the same motor and pintle at another position.

DETAILED DESCRIPTION OF THE INVENTION AND PREFERRED EMBODIMENTS

While this invention is capable of implementation in a variety of forms differing both in configuration and mode of operation, an understanding of the features that define the novel and inventive character of the invention and that are common to all such implementations can be had by a detailed review of specific examples. Two such examples are shown in the Figures.

Figure 1:
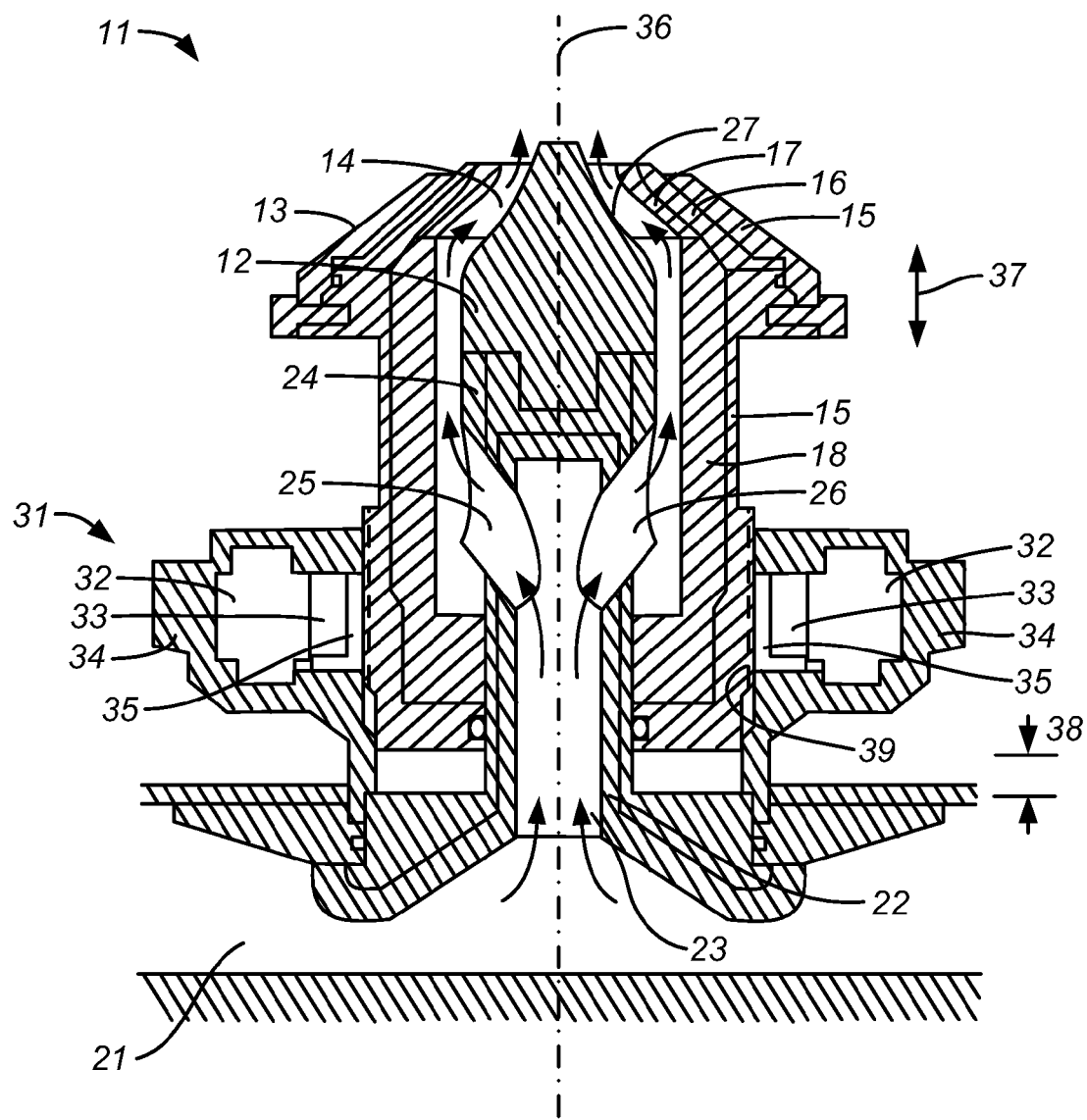
FIGS. 1 and 2 are cross sectional views of one example of a rocket motor embodying the features of the present invention.
Figure 2:
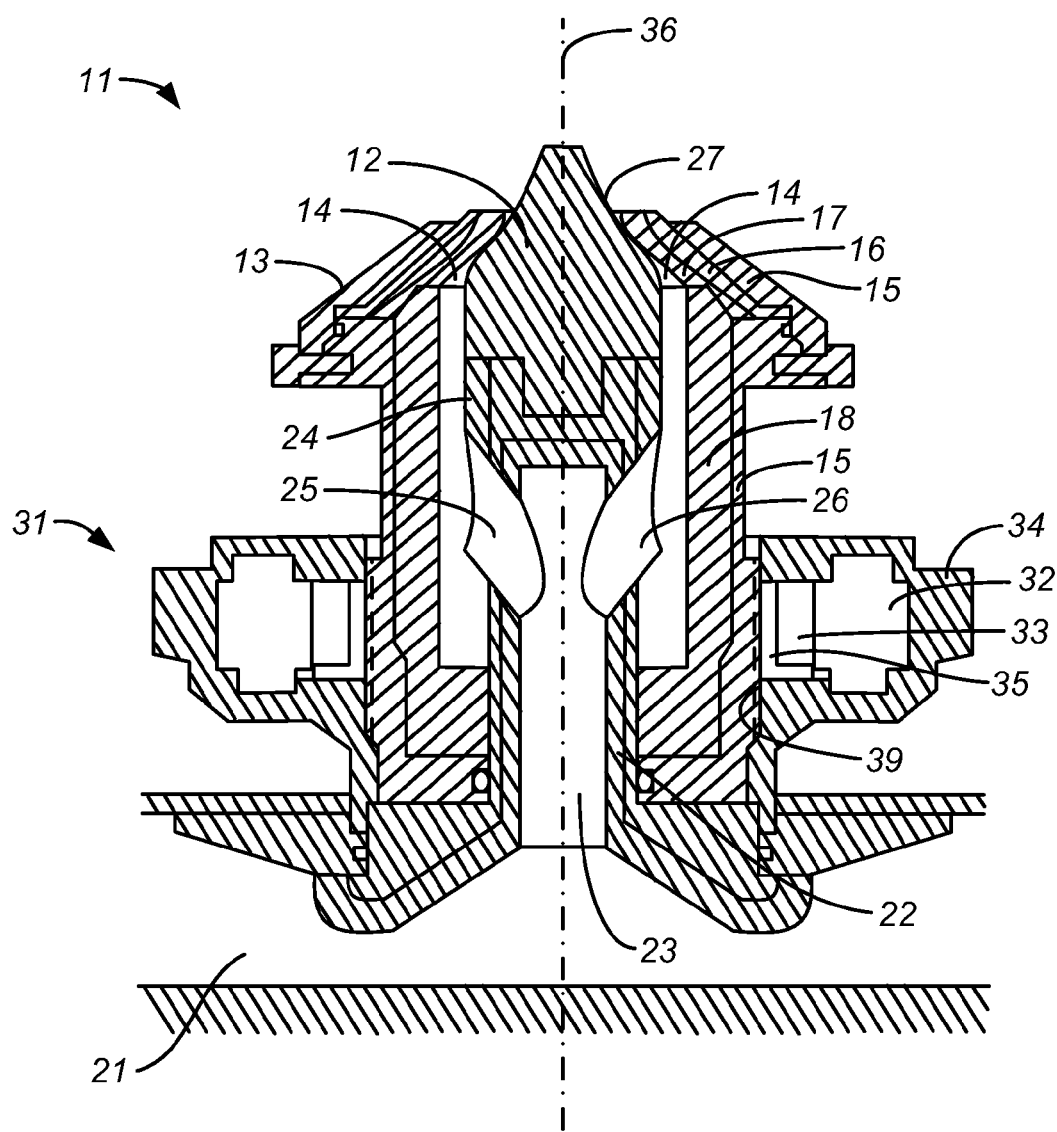

The first example is shown in FIGS. 1 and 2. The propulsion system 11 in this example has a fixed pintle 12 and a movable motor housing 13. The housing 13 is shown at the two ends of its range of motion in the two Figures—fully raised (according to the view shown in these Figures) relative to the pintle 12 to result in an open throat 14 in FIG. 1, and fully lowered to result in a closed throat 14 in FIG. 2. The movable portions of the housing 13 are an outer shell 15, a throat support 16, and a throat liner 17. Downstream of the throat 14, the outer shell 15 is lined with an insulation layer 18. The fixed pintle 12 is immovably secured to a pressure vessel 21 through a hollow post 22 of insulating material that defines an inlet passage 23, and the base of the pintle itself is lined with an insulating layer 24. When the housing is raised, as shown in FIG. 1, the pressurized gas from the pressure vessel 21 enters the inlet passage 23 which is coaxial with the shell, passes through lateral openings 25, 26 in the hollow post 22, then continues in the direction leading to the tapered end 27 of the pintle 12, passing through the throat 14 before reaching the tapered end, and finally leaving the motor as exhaust.

The actuator 31 that controls the position of the movable portions of the housing 13 relative to the pintle 12 is external to the housing and the gas generator and surrounds the body of the housing at a location upstream of the throat. The actuator includes a stator 32 and a rotor 33 enclosed in an actuator case 34. A ring attachment 35, which is either a ball nut, a ring containing an Acme thread, a gear, or any other similar component of a linear motion mechanism, is secured to the internal surface of the rotor 33. A complementary translational component 39, which is either a ball screw, Acme thread, gear teeth, or the like, is secured to the exterior of the outer shell 15 of the housing to mate with the ring attachment 35. Rotation of the rotor 33 thereby causes the housing 13 to move axially along the motor axis 36 in the direction of the arrow 37 while the pintle 12 remains stationary. As noted above, the housing 13 is in a raised position in FIG. 1 and a lowered position in FIG. 2. Comparing FIGS. 1 and 2, the distance 38 by which the housing moves upward to reach the position shown in FIG. 1 is visible at the base of the shell 15 that forms the outermost component of the movable parts of the housing.

Figure 3:
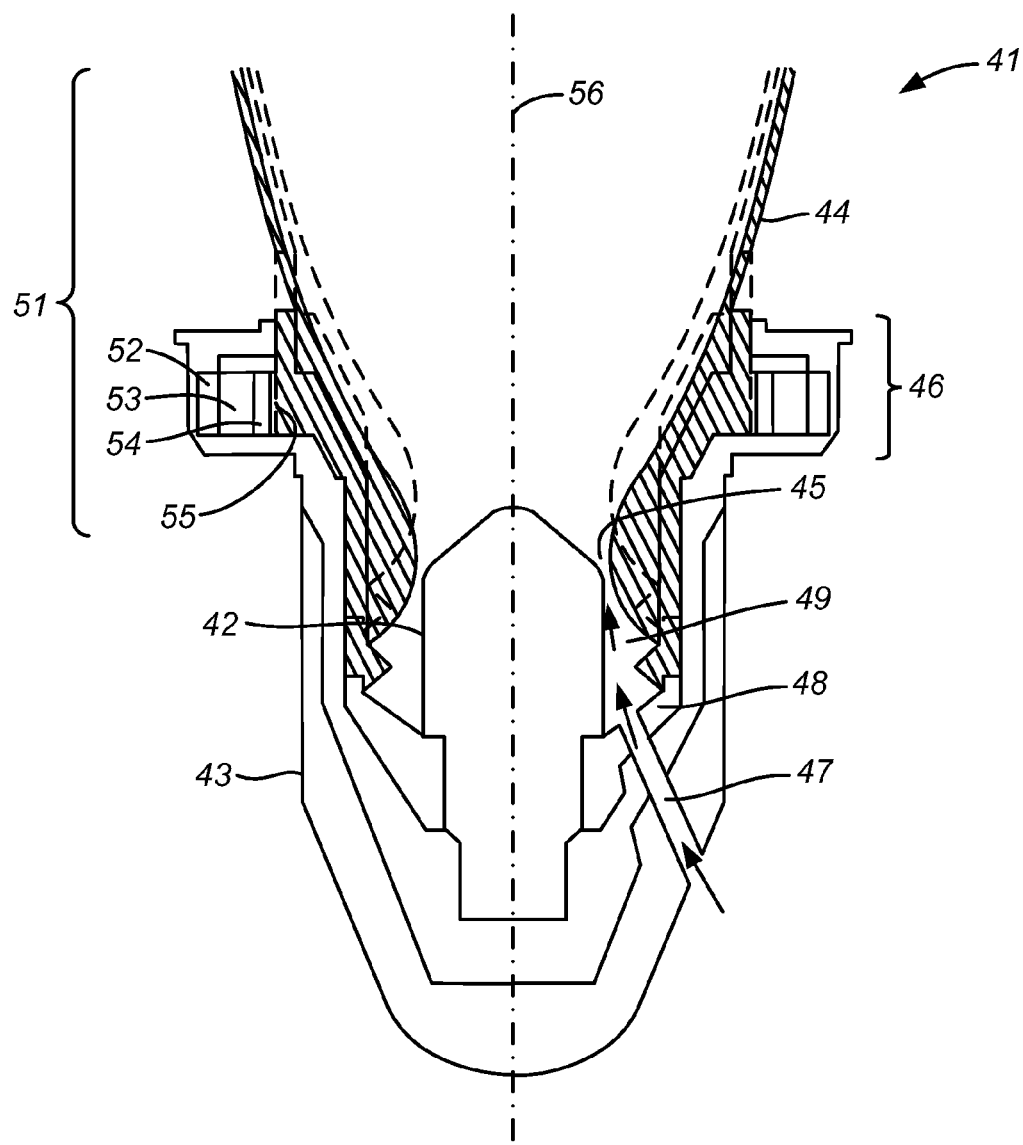
FIG. 3 is a cross section of a second example of a rocket motor embodying the features of the present invention.

The second example is shown in FIG. 3, which also depicts a propulsion system 41 with a fixed pintle 42 and a motor housing 43 with a movable liner 44. The liner 44 is the counterpart to the shell 15 of the example of FIGS. 1 and 2. The throat 45 is formed by the annular space between the pintle 42 and the motor housing liner 44, and the liner 44 is shaded to differentiate it from the stationary parts of the housing. The actuator 46 in this example is located downstream of the throat 45 rather than upstream. Two positions of the motor housing liner 44 relative to the pintle 42 are shown in solid lines and dashed lines, respectively, the dashed line position resulting in a larger throat area 45 than the solid line position. The hot gases enter the nozzle through an inlet 47 which is lateral to the liner, past an insulation layer 48, and into the annular space 49 between the pintle 42 and the motor housing liner 44. The gases then travel across the throat 45, through the divergent portion 51 of the motor formed by the liner 44, and ultimately out to exhaust. The position of the motor housing liner 44 is controlled by the actuator 46 that encircles the divergent portion 51 of the motor. In a construction similar to that of the systems of FIGS. 1 and 2, the actuator 46 includes a stator 52 and a rotor 53, with a rotor liner 54 that serves as a component of a linear motion mechanism, such as a ball screw, Acme thread, or gear teeth, the complementary component 55 located on the opposing external surface of the motor housing liner 44. Rotation of the rotor 53 thus translates to axial movement of the motor housing liner 44 along the common axis 56 of the housing and the pintle.

Actuation systems of the present invention are useful in a variety of rocket motors and propulsion systems including, but not limited to, tactical rockets, throttleable DACS (divert attitude control systems), intercontinental ballistic missiles (ICBMs), and boosters such as the Atlas, Titan, and Delta systems.

In the claims appended hereto, the term "a" or "an" is intended to mean "one or more." The term "comprise" and variations thereof such as "comprises" and "comprising," when preceding the recitation of a step or an element, are intended to mean that the addition of further steps or elements is optional and not excluded. All patents, patent applications, and other published reference materials cited in this specification are hereby incorporated herein by reference in their entirety. Any discrepancy between any reference material cited herein and an explicit teaching of this specification is intended to be resolved in favor of the teaching in this specification. This includes any discrepancy between an art-understood definition of a word or phrase and a definition explicitly provided in this specification of the same word or phrase.

What is claimed is:

1. A pintle-controlled propulsion nozzle comprising:
  (a) a shell shaped forming a propulsion gas flow passage including a throat;
  (b) a pintle positioned inside said throat to define a gap around said pintle for flow of propulsion gas through said throat, said pintle and said shell joined by a movable mounting that allows variation in positions of said pintle and said shell relative to each other and consequently in width of said gap; and
  (c) an actuator external to said shell, said actuator operatively joined to either said pintle or said shell to cause movement thereof and consequently variation in said width of said gap, said actuator comprising a rotor encircling said shell and a linkage to translate rotational movement of said rotor into linear movement.

2. The pintle-controlled propulsion nozzle of claim 1 wherein said actuator is operatively joined to said pintle.

3. The pintle-controlled propulsion nozzle of claim 1 wherein said actuator is upstream of said throat.

4. The pintle-controlled propulsion nozzle of claim 1 wherein said actuator is downstream of said throat.

5. The pintle-controlled propulsion nozzle of claim 1 wherein said shell has a longitudinal axis, said nozzle further comprising an inlet to said throat that is coaxial with said shell.

6. The pintle-controlled propulsion nozzle of claim 1 wherein said shell has a longitudinal axis, said nozzle further comprising an inlet to said throat that is lateral to said shell.

* * * * *